United States Patent
Saionji et al.

[11] Patent Number: 5,523,797
[45] Date of Patent: Jun. 4, 1996

[54] LUMINANCE SIGNAL AND COLOR SIGNAL SEPARATING CIRCUIT

[75] Inventors: Osamu Saionji; Masami Aiura, both of Ibaraki, Japan

[73] Assignee: Motorola, Inc., Schaumburg, Ill.

[21] Appl. No.: 385,261

[22] Filed: Feb. 8, 1995

[30] Foreign Application Priority Data

Feb. 9, 1994 [JP] Japan ................................. 6-015445

[51] Int. Cl.6 ..................................................... H04N 9/78
[52] U.S. Cl. ........................... 348/663; 348/665; 348/666
[58] Field of Search ..................................... 348/663, 665, 348/666, 667, 670; 358/31; H04N 9/77, 9/78

[56] References Cited

U.S. PATENT DOCUMENTS

| | | |
|---|---|---|
| 4,041,531 | 8/1977 | Bingham . |
| 4,489,346 | 12/1984 | Tanaka et al. . |
| 4,661,842 | 4/1987 | Ishige et al. . |
| 4,677,461 | 6/1987 | Mizutani et al. . |
| 4,843,457 | 6/1989 | Yamagata ............................. 348/665 |
| 5,144,399 | 9/1992 | Nakayama et al. . |

*Primary Examiner*—Safet Metjahic
*Assistant Examiner*—Sherrie Hsia
*Attorney, Agent, or Firm*—Harry A. Wolin; Rennie W. Dover

[57] ABSTRACT

A circuit that separates a luminance signal and a color signal so that dot interference in a color transition area of a reproduced image is minimized. A color video signal is transmitted to an adaptive bandpass filter via a vertical carrier color signal extraction filter. An output signal from the adaptive bandpass filter represents the color signal portion of the color video signal. The color signal is subtracted from the color video signal via a subtractor circuit to produce the luminance signal portion of the color video signal. Since the output signal of the bandpass filter is subtracted from the color video signal, the luminance signal portion of the color video signal is separated without being affected by different colors before and after a color transition point.

6 Claims, 3 Drawing Sheets

LUMINANCE SIGNAL AND COLOR SIGNAL SEPARATING CIRCUIT

TECHNICAL FIELD

The present invention relates to a luminance signal and color signal separating circuit that uses horizontal and vertical 2-D digital filters to separate luminance and carrier color signals from a digitized color video signal in video equipment such as color television receivers and videodisc players.

BACKGROUND

FIG. 1 shows a prior example of a luminance signal and color signal separating circuit. With this luminance signal and color signal separating circuit, an NTSC color video signal digitized at a sampling frequency of 4 $f_{sc}$ (where $f_{sc}$ is a subcarrier frequency) is supplied to a 1 H (one horizontal interval) delay element 11 that forms a comb filter as a vertical carrier color signal extraction filter and to a subtractor 12. The subtractor 12 subtracts a 1 H preceding video signal from the current video signal. To the output of the subtractor 12 is provided a BPF (band-pass filter) 13 that forms a horizontal carrier color signal extraction filter.

The BPF 13 has a center frequency located at a subcarrier frequency $f_{sc}$ (=3.58 MHz). More specifically, as shown in FIG. 2, four elements 131–134 from the input terminal IN are connected in series. The delay elements 131–134 delay the signal by 70 nsec (sampling period) as delay time T. In addition, an adder 135 is provided which adds the input signal to the input terminal IN with the output signal of the delay element 134, while a subtractor 136 is connected to the output of the delay element 132. To the subtractor 136 is supplied the output signal of the adder 135 via an inverter 137, so that the output signal of the inverter 137 is subtracted from the output signal of the delay element 132. That is, assuming that the signal level of the input terminal IN, the output signal level of the delay element 132, and the output signal level of the delay element 134 are A, B, and C, respectively, then the output level of the subtractor 136 is (B−(A+C)/2)/2, so that it is derived as a color signal. Note that the adder 135 and subtractor 136 have a capability to scale by ½ and output the result of their calculation.

On the other hand, the color video signal is supplied to a subtractor 15 via a delay element 14. The delay element 14 compensates for the delay caused by the BPF 13. The subtractor 15 subtracts from the output signal of the delay element 14 the output signal of the BPF 13, i.e., the color signal, and outputs the result of the subtraction as a luminance signal.

With such a prior luminance signal and color signal separating circuit, because the signal levels A, B, and C have a time difference of 140 nsec, that is, a 180° phase difference, from each other, as described above, color phase information before and after horizontal color transitions are mixed during such transitions and outputted as a color signal from the subtractor 136. Thus, because a luminance signal is separated from the color video signal corresponding to the color signal whose phase information is distorted, the luminance signal and color signal are not properly separated, thus causing dot interference in color transition areas of a reproduced image.

Accordingly, it is an object of the present invention to provide a luminance signal and color signal separating circuit that can properly separate the luminance signal and color signal in horizontal color transition areas of an image, thereby minimizing dot interference in color transition areas of a reproduced image.

SUMMARY OF THE INVENTION

A luminance signal and color signal separating circuit according to the present invention comprises: a vertical carrier color signal extraction filter for extracting a vertical carrier color band component in a digitized color video signal; a horizontal carrier color signal extraction filter for extracting a horizontal carrier color band component in the output signal of the vertical carrier color signal extraction filter to provide a carrier color signal; and a luminance signal extraction means for subtracting the output signal of the horizontal carrier color signal extraction filter from the color video signal to provide a luminance signal, wherein said horizontal carrier color signal extraction filter further includes: a first delay means for outputting a first delay signal, wherein said first delay signal is the output signal of the vertical carrier color signal extraction filter delayed by a first predetermined time; a second delay means for outputting a second delay signal, wherein said second delay signal is the output signal of said vertical carrier color signal extraction filter delayed by a second predetermined time; a phase inverting means for inverting the phase relationship between the first delay signal and the output signal of the vertical carrier color signal extraction filter and second delay signal; an intermediate value selecting means for selectively outputting as an intermediate value signal a signal having an intermediate value among the output signal of the vertical carrier color signal extraction filter, the first and second delay signals derived through the phase inverting means; and an adding means for adding the intermediate value signal to the first delay signal outputted from the first delay means, thereby providing the carrier color signal.

With the luminance signal and color signal separating circuit of the present invention, the output signal of the vertical carrier color signal extraction filter is delayed by the first and second delay elements, so that the first delay signal, which is the output signal of the vertical carrier color signal extraction filter delayed by a first predetermined time, is outputted from the first delay means, while a second delay signal, also delayed by a second predetermined time, is outputted from the second delay means. After a phase relationship between the first delay signal, and the output signal of the vertical carrier color signal extraction filter and the second delay signal is inverted, a signal having an intermediate value of each of the signals is outputted as an intermediate value signal from the intermediate value selecting means; because the resulting intermediate value signal does not introduce a mixture of signals indicative of different colors before and after a color transition point, the addition of the output signal of the first delay means and the intermediate value signal permits a horizontal carrier color signal to be extracted, without any distortion of the phase information, at the horizontal carrier color signal extraction filter.

DETAILED DESCRIPTION OF THE PREFERRED EMBODIMENT

An embodiment of the present invention will be described hereinbelow with reference to the drawings.

Figure 3:
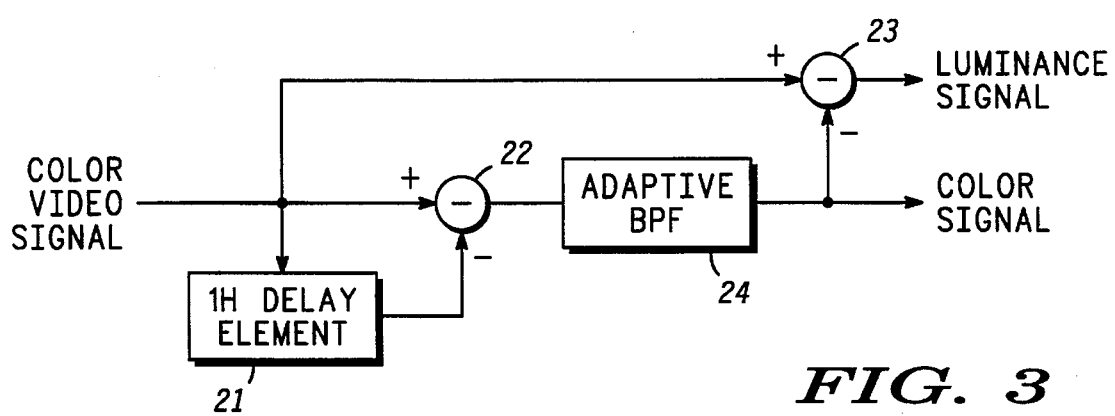
FIG. 3 is a block diagram depicting an embodiment of the present invention.

FIG. 3 depicts a luminance signal and color signal separating circuit according to the present invention. With this luminance signal and color signal separating circuit, there are provided a 1 H delay element 21, subtractors 22 and 23, and an adaptive BPF 24. The delay element 21 and subtractors 22 and 23 are configured similarly to the delay element 11 and subtractors 12 and 15 in the prior circuit shown in FIG. 1. The BPF 24 is provided as a horizontal carrier color signal extraction filter that inputs an output signal of a vertical carrier color signal extraction filter that is comprised of the delay element 21 and subtractor 22.

Figure 4:
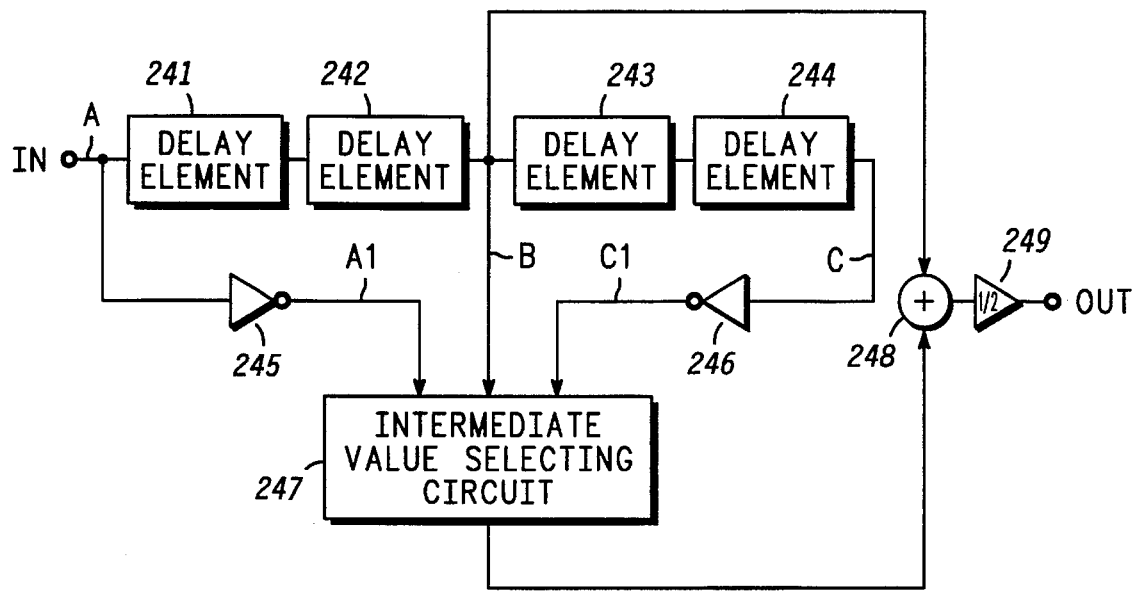
FIG. 4 is a block diagram depicting a specific arrangement of the adaptive BPF in the circuit of FIG. 3.

As more specifically shown in FIG. 4, the BPF 24 has four delay elements 241–244 connected in series from the input terminal IN. The delay elements 241–244 delay the signal by 70 nsec (sampling period) as delay time T. To the input terminal IN and the output of the delay element 244 are connected inverters 245 and 246, respectively, the outputs of which are supplied together with the output signal of the delay element 242 to an intermediate value selecting circuit 247. The intermediate value selecting circuit 247 comprises, for example, a comparator, such that it compares values of the three input signals to detect an intermediate value, i.e., a value other than the maximum and minimum values. It should be appreciated that if two of the three values are the same, that same value is selected, and if all the three values are the same, that same value is selected.

To the output of the intermediate value selecting circuit 247 is connected an adder 248, which adds the output signal of the delay element 242 with the output signal of the intermediate value selecting circuit 247. The output signal of the adder 248 is supplied to the output terminal OUT via a ½ multiplier 249.

Figure 5:
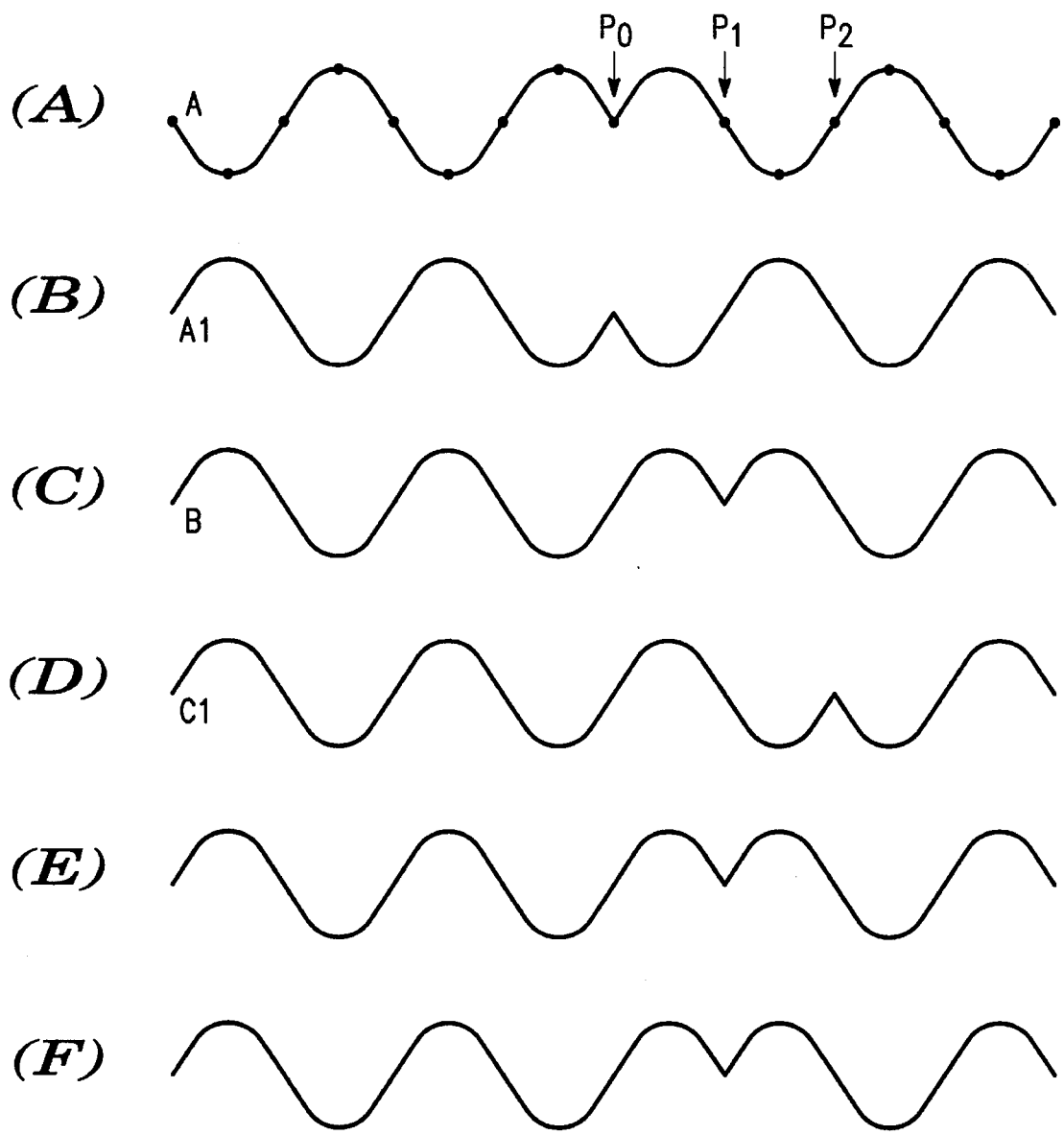
FIGS. 5(a)–5(f) comprises signal waveforms at various portions within the adaptive BPF.

With the luminance signal and color signal separating circuit so configured according to the present invention, from an NTSC input color video signal digitized at a sampling frequency of 4 $f_{sc}$, a vertical color signal component is extracted by the delay element 21 and subtractor 22 in a similar manner to the prior circuit. The output signal of the subtractor 22 is delayed by the delay elements 241–244 in the BPF 24. Now, assuming that the input signal from the subtractor 22, the output signal (first delay signal) of the delay element 242, and the output signal (second delay signal) of the delay element 244 are A, B, and C, respectively, and that the input signal A changes as shown in FIG. 5(a), then the output signal A1 of the inverter 245 is a phase inverted version of the signal A as shown in FIG. 5(b). Note that dots on the waveform in FIG. 5(a) represent sampling points. The output signal B of the delay element 242, as shown in FIG. 5(c) is delayed by 180° in color signal phase with respect to the signal A. Because the output signal C of the delay element 244 is further delayed by 180° with respect to the signal B and is phase-inverted by the inverter 246, the output signal C1 of the inverter 246 changes as shown in FIG. 5(d).

At the intermediate value selecting circuit 247, an intermediate value is detected from signals A1, B, and C1. For the same color, signals A1, B, and C1 have the same waveform. That is, if the color changes at sampling point $P_0$ of the signal A, the same waveforms are observed up to point $P_0$ as shown in FIGS. 5(b) through (d). Thus, the output signal of the intermediate value selecting circuit 247 has the same waveform as the signals A1, B and C1, as shown in FIG. 5(e). The signal A1 indicates a new color from point $P_0$ where the color has changed to point $P_1$ which is delayed by 180° while the signals B and C1 indicate the color that remains as before. Thus, either the signal B or C1 is selected. The signals A1 and B indicate a new color over a range from point $P_1$ to point $P_2$ further delayed by 180°, while the signal C1 indicates the color that remains as before. Thus, either the signal A1 or B is selected. After point $P_2$, since the signals A1, B and C1 all indicate a new color, the output signal of the intermediate value selecting circuit 247 has the same waveform as that of signal A1, B and C1. In this way, the signal outputted from the intermediate value selecting circuit 247 will not introduce a mixture of signals indicative of different colors before and after a color transition.

The output signal of the intermediate value selecting circuit 247 is added with the signal B by the adder 248, and subsequently converted to one half the signal level by the ½ multiplier 249. Thus, a color signal is outputted from the BPF 24, where the signal that changes as shown in FIG. 5(f) is separated.

Because the output signal of the BPF 24 is subtracted from the color video signal at the subtractor 23, a luminance signal is properly separated without being affected by different colors before and after a color transition point.

In the above embodiment, although the sampling frequency is 4 $f_{sc}$, it is clear that this is not a limitation, but the present invention is applicable to other frequencies of 2×n× $f_{sc}$ (where n is an integer).

Figure 6:
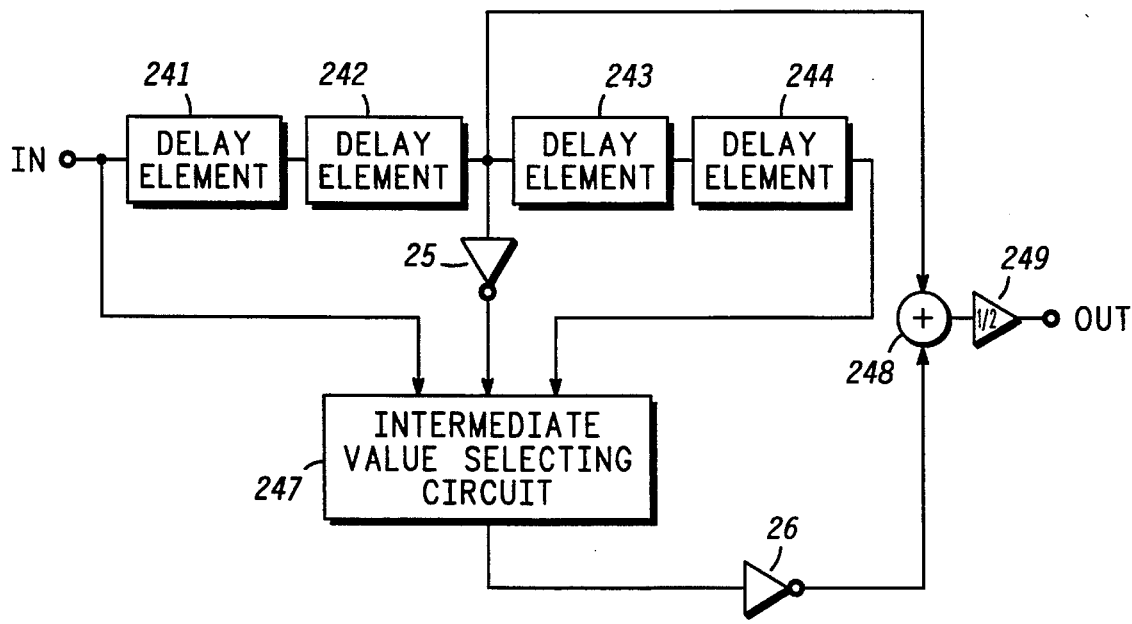
FIG. 6 is a block diagram depicting another arrangement of the adaptive BPF in the circuit of FIG. 3.

Additionally, the adaptive BPF 24 in the above embodiment may be configured as depicted in FIG. 6. In this case, an inverter 25 is provided between the delay element 242 and the intermediate value selecting circuit 247, while an inverter 26 is provided between the output of the intermediate value selecting circuit 247 and the adder 248.

Figure 1:
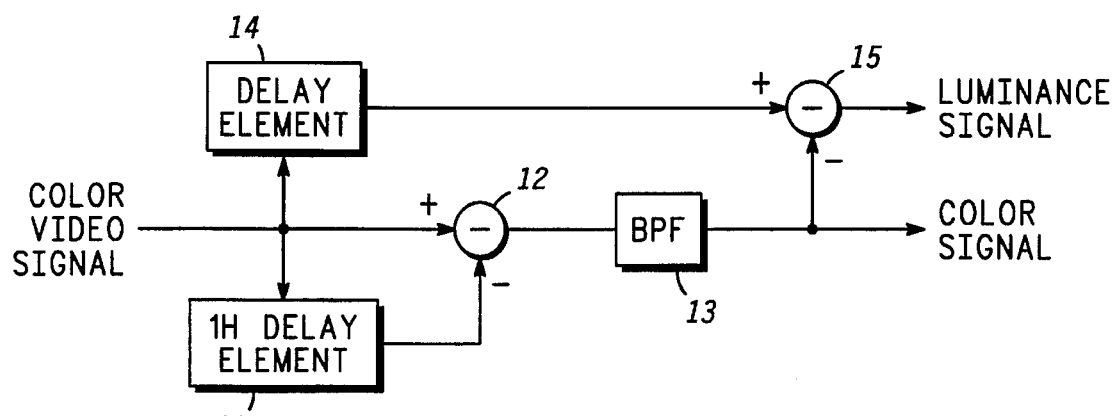
FIG. 1 is a block diagram depicting a prior art luminance signal and color signal separating circuit.
Figure 2:
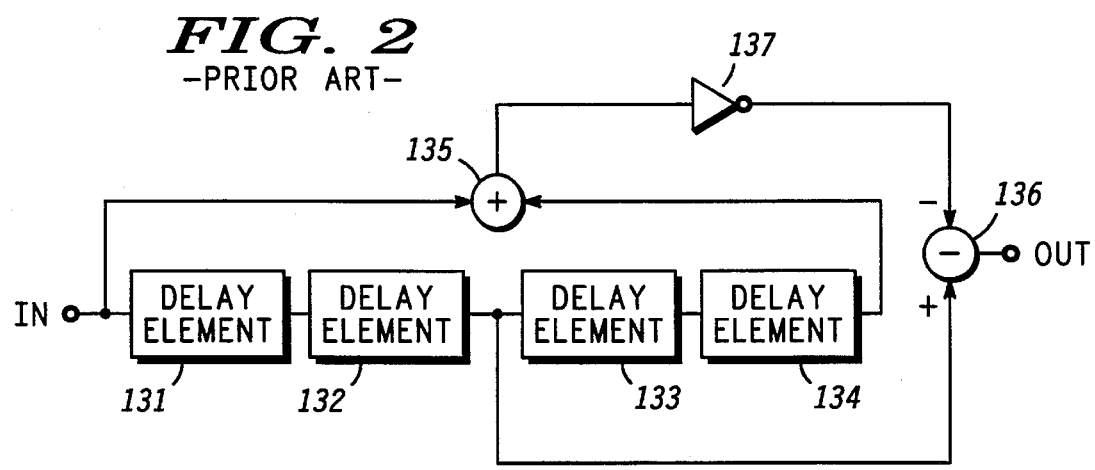
FIG. 2 is a block diagram depicting a specific arrangement of the BPF in the circuit of FIG. 1.

Furthermore, in the above embodiment, although the color video signal is directly supplied to the positive input terminal of the subtractor 23, the color video signal may be supplied via a delay element in a similar manner to FIG. 1.

Thus, with the luminance signal and color signal separating circuit of the present invention, because a first delay signal, which is an output signal of a vertical carrier color signal extraction filter delayed by a first predetermined time, and a second delay signal, which is similarly delayed by a second predetermined time, are generated, and a phase relationship between the first delay signal and the output signal of the vertical carrier color signal extraction filter and second delay signal is inverted, after which a signal having a intermediate value of each of the signals is obtained as an intermediate value signal, the resulting intermediate value signal is prevented from containing a mixture of signals indicative of different colors before and after a color transition. Therefore, by adding the first delay signal and the intermediate value signal, a color signal can be outputted from the horizontal carrier color signal extraction filter, where color phase information is not mixed before and after a horizontal color transition. This permits the luminance signal derived by subtracting the color signal from the color video signal to be separated properly from the color signal, so that dot interference in the horizontal color transition areas of the image can be minimized.

We claim:

1. A luminance signal and color signal separating circuit comprising:

a vertical carrier color signal extraction filter for extracting a vertical carrier color signal band component in a digitized color video signal;

a horizontal carrier color signal extraction filter for extracting a horizontal carrier color signal band component in the output signal of said vertical carrier color signal extraction filter to provide a carrier color signal; and a luminance signal extraction means for subtracting the output signal of said horizontal carrier color signal extraction filter from said color video signal to provide a luminance signal, said horizontal carrier color signal extraction filter further including:

a first delay means for outputting a first delay signal, wherein said first delay signal is the output signal of said vertical carrier color signal extraction filter delayed by a first predetermined time;

a second delay means for outputting a second delay signal, wherein said second delay signal is the output signal of said vertical carrier color signal extraction filter delayed by a second predetermined time;

a phase inverting means for inverting the phase relationship between said first delay signal and the output signal of said vertical carrier color signal extraction filter and said second delay signal;

an intermediate value selecting means for selectively outputting as an intermediate value signal a signal having an intermediate value among the output signal of said vertical carrier color signal extraction filter, said first and second delay signals derived through said phase inverting means; and an adding means for adding said intermediate value signal to said first delay signal outputted from said first delay means, thereby providing said carrier color signal.

2. A luminance signal and color signal separating circuit according to claim 1, wherein:

said phase inverting means further includes:

a first inverter for inverting the phase of the output signal of said vertical carrier color signal extraction filter; and a second inverter for inverting the phase of said second delay signal outputted from said second delay means, so that each output signal of said first and second inverters and said first delay signal outputted from said first delay means are supplied to said intermediate value selecting means; and said adding means further includes:

an adder for adding said intermediate value signal outputted from said intermediate value selecting means and said first delay signal outputted from said delay means; and a multiplier for multiplying by ½ the result of the addition of said adder.

3. A luminance signal and color signal separating circuit according to claim 1, wherein said phase inverting means further includes a first inverter for inverting the phase of said first delay signal outputted from said first delay means, so that the output signal of said vertical carrier color signal extraction filter, said second delay signal outputted from said second delay means, and the output signal of said first inverter are supplied to said intermediate value selecting means; and said adding means further includes:

a second inverter for inverting the phase of said intermediate value signal outputted from said intermediate value selecting means;

an adder for adding the output signal of said second inverter and said first delay signal outputted from said first delay means; and a multiplier for multiplying by ½ the result of the addition of said adder.

4. A luminance signal and color signal separating circuit according to claim 1, wherein said first predetermined time is a time that corresponds to 180° in phase difference of the horizontal carrier color signal band component, and said second predetermined time is a time that corresponds to 360° in phase difference of the horizontal carrier color signal band component.

5. A luminance signal and color signal separating circuit according to claim 1, wherein said color video signal is sampled at a frequency 2×n (where n is an integer) times a subcarrier frequency, and wherein said first and second delay means are connected in series, each having a signal delay function corresponding to an n-sampling interval.

6. A luminance signal and color signal separating circuit according to claim 1, wherein said vertical carrier color signal extraction filter further comprises:

a third delay means for delaying said color video signal by one horizontal scanning interval; and a subtracting means for subtracting the output signal of said third delay means from said color video signal.

* * * * *